United States Patent [19]

Kuchuk-Yatsenko et al.

[11] 3,978,746
[45] Sept. 7, 1976

[54] DEVICE FOR REMOVING FLASH AFTER RESISTANCE BUTT WELDING OF RAILS

[76] Inventors: Sergei Ivanovich Kuchuk-Yatsenko, ulitsa Filatova, 1/22, kv. 47; Sergei Alexandrovich Solodovnikov, ulitsa Vernadskogo, 63, kv. 44; Vasily Alexeevich Sakharnov, Bulvar Likhacheva, 3, kv. 64; Ivan Korneevich Golomovzjuk, ulitsa Vetryanaya, 28, kv. 1; Alexandr Ivanovich Kulesh, ulitsa Kudryashova, 6, kv. 39; Fedor Konstantinovich Porkhun, ulitsa Malaya Kitaevskaya, 73, kv. 56, all of Kiev, U.S.S.R.

[22] Filed: May 15, 1975

[21] Appl. No.: 577,941

[30] Foreign Application Priority Data
May 30, 1974  U.S.S.R. ............................. 2027967

[52] U.S. Cl. .......................................... 83/1; 59/29; 83/620; 83/914
[51] Int. Cl.² ...................................... B23C 3/12
[58] Field of Search ................. 83/1, 3, 914, 620; 59/29

[56] References Cited
UNITED STATES PATENTS

| | | | |
|---|---|---|---|
| 3,134,012 | 5/1964 | Neukom et al. | 83/914 X |
| 3,508,463 | 4/1970 | Hammon | 83/914 X |
| 3,597,958 | 8/1971 | Gross | 83/914 X |
| 3,703,114 | 11/1972 | Topopolsky et al. | 83/914 X |

*Primary Examiner*—Frank T. Yost
*Attorney, Agent, or Firm*—Lackenbach, Lilling & Siegel

[57] ABSTRACT

A device for removing flash from rails after resistance butt welding, mounted on a welding machine case and split along the vertical axis of the rail, comprising three cutters embracing the rail along the entire cross-sectional perimeter thereof and coupled with a hydraulic cylinder drive, one of said cutters is pivotally mounted on said case, split along the vertical axis thereof and contacts the rail rolling surface, while the two side cutters which embrace the sides of the rail head, the web and the base flange of the rail are arranged symmetrically relative to the vertical axis of the case and hinged thereto, the top portions of said side cutters being linked by an articulated rod.

1 Claim, 3 Drawing Figures

DEVICE FOR REMOVING FLASH AFTER RESISTANCE BUTT WELDING OF RAILS

The present invention relates to resistance butt welding equipment, and, more particularly, to a device for removing flash from rails after resistance butt welding process.

The ever growing quality requirements of welded products makes the development of novel welding equipment impossible without effective techniques of removing flash from rails after welding.

Removal of flash formed during welding is an important factor influencing the efficiency of the equipment employed during the resistance butt welding process.

From the viewpoint of the recent requirements, the efficiency of the welding equipment now in use is rather low unless the welding process is combined with flash removal. This is particularly true of the rail welding practice of prior-art Soviet-made welding machines wherein the welding process is programmed and carried out automatically, but auxiliary equipment is required for the flash removal from the welded joints of rails, with the result that the effectiveness of the operation is affected.

It is a common practice, after the welding process is completed both under stationary and field conditions, to extract the rail from the welding machine, and to cut off cold flash manually by means of pneumatic chisels which renders the operation exceedingly labour consuming since reliable equipment for removing flash from rails practically does not exist.

Known in the art is a device for removing flash from rails and steel sections, comprising two clamping posts, one of which carries guides with cutters provided on the ends thereof, said cutters being coupled to a linkage actuated by a hydraulic cylinder.

The cutters provided on the guides and intended to cut flash off the surfaces of the rail welded joint have a shape identical to that of the cross-section of the article being welded. The welded article with flash formed during welding is fed into the device. One end of the article is fixed by the clamps of one post, while the guides provided in the other post and carrying the cutters move toward the welded seam under the action of the linkage actuated by the hydraulic cylinder and the flash is removed from the rail surface by the cutters.

A disadvantage inherent in said prior-art device for removing flash from welded rails is the low efficiency since the welding process is not combined with the subsequent flash removal in a single unit involving a minimized number of intermediate operations performed within as short time as possible practically not affecting temperature variations in the hot weld joint. The apparatus itself is bulky and requires a special linkage actuated by a hydraulic drive to control the flash removal operation.

The welded article released from the welding machine is transferred to the device for flash removal. During this displacement the article cools down with the result that the effort required for flash removal rises considerably.

There is also known a device for removing flash from welded rails, made in the form of a framework which mounts swivelling cutters having a shape identical to that of the cross section of the article being welded.

Longitudinal travel of the cutters relative to the framework is effected by virtue of extension of the rods of hydraulic cylinders hinge-connected to said framework. The longitudinal travel of the cutters for flash removal of said device is controlled by special split couplings provided on the rods of the hydraulic cylinders. The rods of the hydraulic cylinders impart motion to the turning linkages and to worm gears associated therewith thereby enabling the cutters to swivel gradually about the hinge joints and remove the flash, the axes of the hinge joints being normal to the longitudinal plane of said framework. The swivel angle of the cutters is adjustable by means of the split couplings mounted on the hydraulic cylinder rods.

Said device also suffers from a disadvantage residing in that the welding process is not combined with subsequent flash removal in a single unit involving a minimized number of intermediate operations performed within as short time as possible practically not affecting temperature variations in the hot weld joint. Besides, an auxiliary substation must be provided to supply power to the hydraulic drive. The construction of the device is cumbersome, the metal consumption being considerably higher than that of the known device.

Also known in a device for removing flash from welded joints employed in resistance butt welding continuous-flash machines, constructed in the form of two posts, one of them being movable. Both posts have movable and fixed clamps for holding welded articles. The hydraulic drive for up-setting the article being welded is attached to the movable post. The device for removing flash is located behind the welding machine relative to the direction of displacement of the article being welded, and the top and the bottom portions have a shape identical to that of the cross section of the article. The top portion of the device travels in the vertical plane together with the moving clamp holding the article being welded. Arranged directly behind the device for removing flash from the article being welded are drive rollers.

A disadvantage inherent in said device for removing flash from welded joints in resistance butt welding continuous-flash machines is the low efficiency thereof because the welding process is not combined with subsequent flash removal in a single unit involving a minimized number of intermediate operations between welding and flash removal performed within as short time as possible practically not affecting temperature variations in the hot weld joint. Additionally, the construction is cumbersome due to the use of drive rollers and clamps.

There is likewise known a device for removing flash from welded joints employed in resistance butt welding machines, comprising two clamping jaws attached to a stationary post of the welding machine. The welded article with flash formed upon completion of welding is transferred from the welding area to the area of the cutters arranged beside the pair of clamping jaws on the stationary post. Owing to the extension of the hydraulic cylinder rod and to the provisions of a taper access between the stress-bearing parts of the clamping jaws, the cutters move forward and cut the flash off the welded joint.

The device suffers from a disadvantage in that the cutters removing the flash from the welded joint are arranged beside the outlet through which the welded article is released from the clamping jaws, with the result that the welded joint has enough time to cool while it moves to the area of the cutters after the completion of the welding process.

After the welded joint looses its initial temperature, the flash removal requires more effort. In addition, the welding process in said device is not combined with flash removal in a single unit involving a minimized number of intermediate operations performed within as short time as possible practically not affecting temperature variations in the hot weld joint. The intermediate operations considerably affect the operating efficiency of the device.

It is an object of the present inventon to obviate the above disadvantages.

Another object of the invention is to provide a device for removing flash from welded rails, wherein the welding process proper is combined with flash removal in a single welding machine involving a minimized number of intermediate operations between the welding process and the flash removal performed within as short time as possible practically not affecting temperature variations in the hot weld joint.

These and other objects are attained in a device for removing flash from rails after resistance butt welding mounted on a welding machine, comprising a case split along the vertical axis of the rail and accommodating cutters which embrace the rail along the entire cross-sectional perimeter thereof and are coupled to a hydraulic cylinder drive, wherein, according to the invention, the three cutters so provided are actuated by a hydraulic cylinder rod and one of the cutters is pivotally mounted on the case, contacts the rail rolling surface, has a shape identical to that of the rail rolling surface and is split along the vertical axis of the case, whereas the two side cutters which embrace the sides of the rail head, the web and the base flange of the rail are arranged symmetrically relative to the vertical axis of the case and are hinge-connected thereto, the top portions of the side cutters being linked by an articulated rod.

The herein proposed device for flash removal from rail joints of resistance but welding machine enables successful combination of the welding and flash removal operations, while simple construction of the device will ensure its easy mounting and detaching, as well as will render it convenient-to-attend. Combination of the welding and flash removal operations with the use of the proposed device will not involve any additional arrangements or drives, since the flash cutters of the device are actuated from the hydraulic cylinders that clamp and release the current-carrying jaws of the welding machine, while the flash removing operations are actuated from the upset hydraulic cylinders of the welding machine that makes use of the herein proposed device.

The invention will now be described in detail with reference to a preferred embodiment thereof taken in conjunction with the accompanying drawings, wherein.

Figure 1:
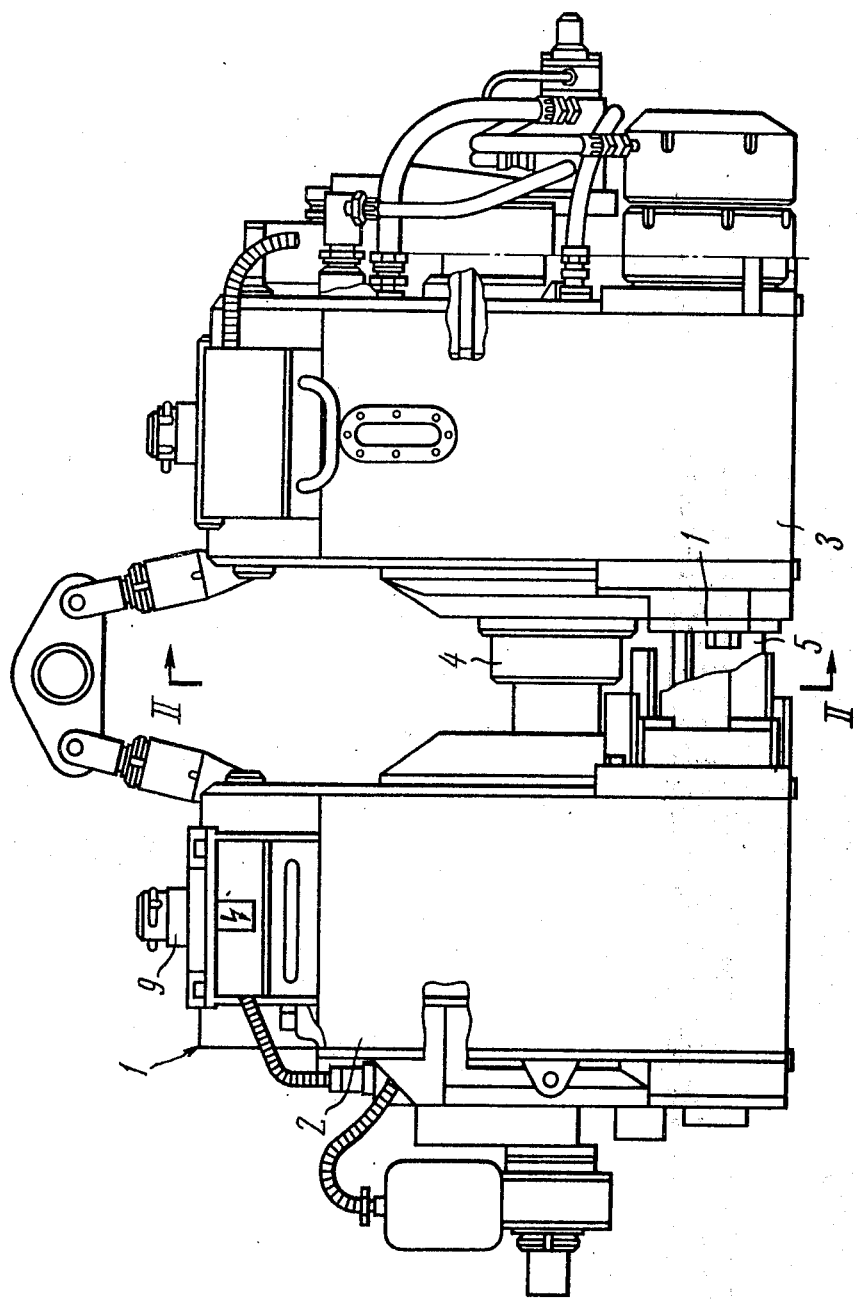
FIG. 1 shows a side view of an embodiment of a device for removing flash from welded rails in a resistance butt welding machine provided with a pinch grip of rails.

A device 1 for removing flash from weld joints of rails is mounted on a resistance butt welding machine. The resistance butt welding machine incorporates two cases 2 and 3 seated on a shaft 4 and adapted to travel along said shaft when acted upon by hydraulic cylinders 5. The device 1 for flash removal is mounted on the case 3 and is axially aligned with the welded rails placed between the cases 2 and 3 of the welding machine.

Figure 2:
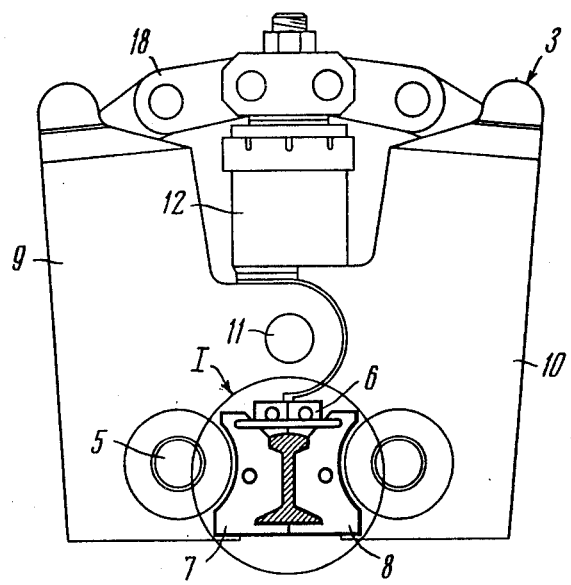
FIG. 2 is a cross sectional view of the device for removing flash from weld joints of rails on a welding machine taken along the line II-II in FIG. 1.

The flash removal device 1 comprises three cutters 6, 7 and 8 (FIG. 2) embracing the rail on the cross-sectional perimeter thereof. The cutters 6, 7 and 8 intended to cut flash off the welded rail joints are actuated by the hydraulic cylinder 5. The case 3 of the welding machine is made of two portions 9 and 10 hinge-connected to each other by means of a pin 11.

In addition, the top portions 9 and 10 of the case 3 are linked to each other by rods 18, with a rod of a hydraulic cylinder 12 located in between.

The cylinder 12 of the welding machine serves for synchronizing the operation of fixing the cutters 6, 7 and 8 cutting flash off the welded joints with the operation of pinching the rail, and also for synchronizing the operation of releasing the worked rail clamped by the cutters 6, 7 and 8 upon completion of welding.

Figure 3:
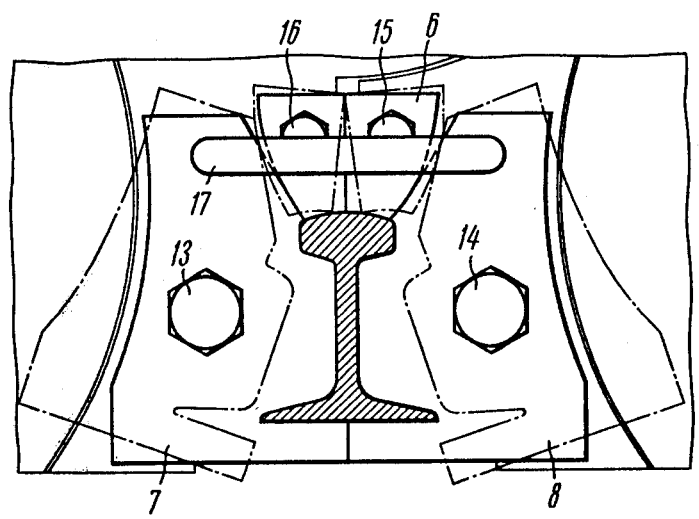
FIG. 3 is an enlarged scale view of Area I in FIG. 2 showing the cutters embracing the rail along the entire cross-sectional perimeter, when closed, and the cutters are also shown in phantom when open.

Each portion 9 and 10 of the case 3 accommodates one of the hydraulic cylinders 5, the rods thereof being linked with the case 2 (FIG. 1) of the welding machine. In addition, the portions 9 and 10 (FIG. 2) of the case 3 of the welding machine carry the swivelling side cutters 7 and 8 (FIG. 3) attached by means of bolts 13 and 14, whereas the cutter 6 in contact with the rail rolling surface is hinge-connected to the case 3 by means of bolts 15 and 16, and is split along the break line of the portions 9 and 10 of the case 3 of the welding machine. The top portions of the side cutters 7 and 8 are interconnected by means of an articulated rod 17.

The device for removing flash from welded rails in resistance butt welding machines operates as follows.

The rails ready for welding are introduced into the cases 2 and 3 (FIG. 1). When acted upon by the hydraulic cylinder 12 (FIG. 2), the rail is pinched inside the cases 2 and 3 (FIG. 1), with simultaneous fixing by the side cutters 7 and 8 (FIGS. 2 and 3) of the rail profile. Immediately upon completion of the welding process, further travel of the rods of the hydraulic cylinders 5 (FIG. 2) causes the case 3 together with the cutters 6, 7 and 8 attached thereto to move toward the welded joint, to remove flash from it. It should be noted that before the case 3 is set in motion, the rail pinched therein is partly released, but only enough to permit sliding of the rail, and only then is the flash removal operation started.

After the flash removal is completed, under the action of the hydraulic cylinders 12 the cases 2 and 3 release the rail pinched thereinside simultaneously with the release of the rail by flash cutters 6, 7 and 8.

The outside dimensions of the device and the component parts thereof are adapted to the fitting areas of the cases 2 and 3 so that the device can be arranged inside the welding machine in the immediate vicinity of the welded joint without interfering with the operation of the welding machine or with access to the welding machine components during maintenance thereof.

What is claimed is:

1. A device for removing flash from rails after resistance butt welding mounted on a welding machine, which incorporates cases split along the vertical axis of the rails comprising: three cutters embracing the rail along the entire cross-sectional perimeter thereof and coupled with a hydraulic cylinder drive; one of said cutters pivotally mounted on one of said cases is split along the vertical axis thereof and contacts the rail rolling surface following the shape thereof while the other two of said side cutters embracing the sides of the rail head, the web and the base flange of the rail are arranged symmetrically relative to the vertical axis of said case and hinge-connected thereto, the top portions of side cutters being linked by an articulated rod.

* * * * *